A. E. DIETERICH.
CUP PASTRY MAKING MACHINE.
APPLICATION FILED OCT. 1, 1917.
1,294,634.
Patented Feb. 18, 1919.
14 SHEETS—SHEET 1.
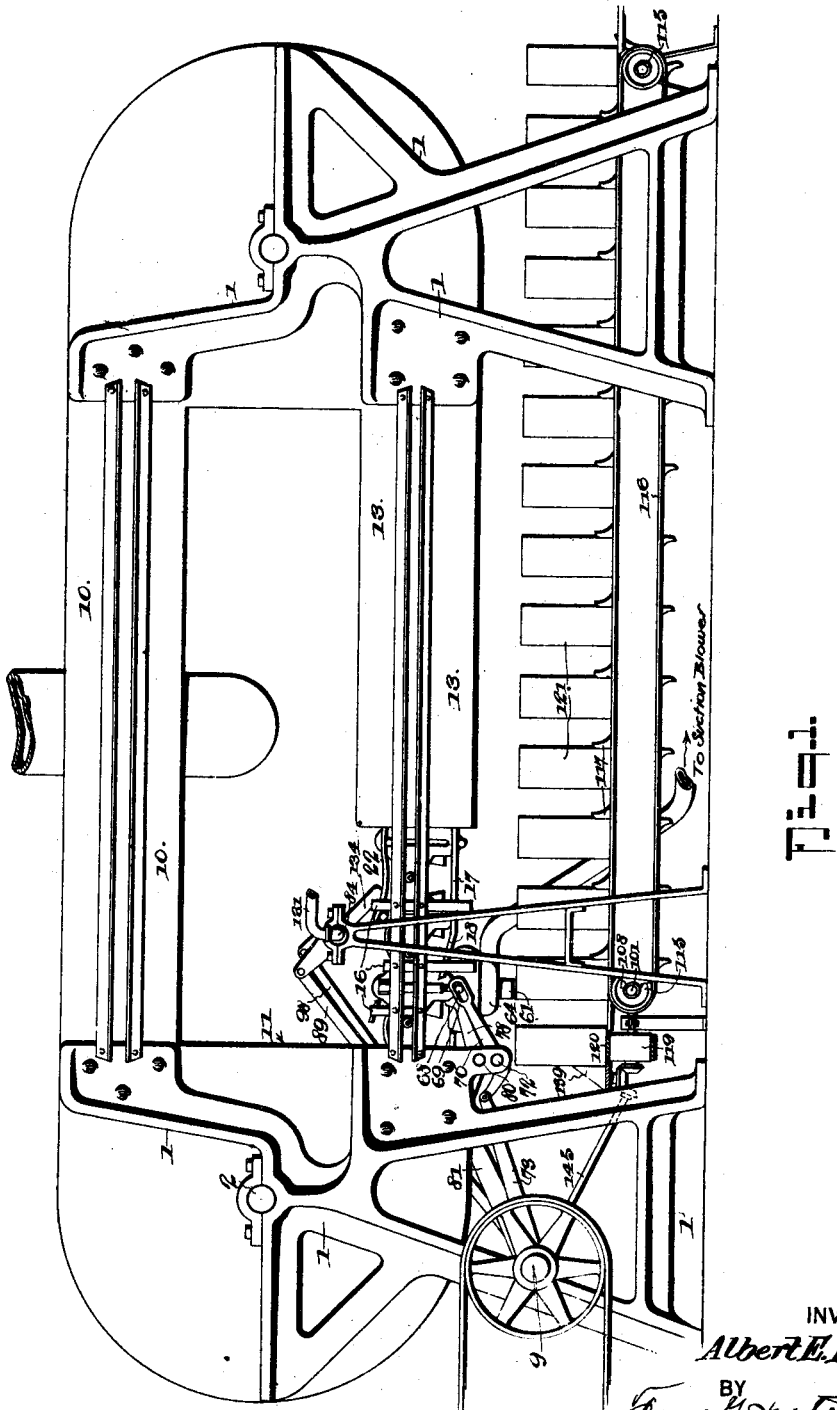
INVENTOR
Albert E. Dieterich,
BY
Fred G. Dieterich Co.
ATTORNEYS

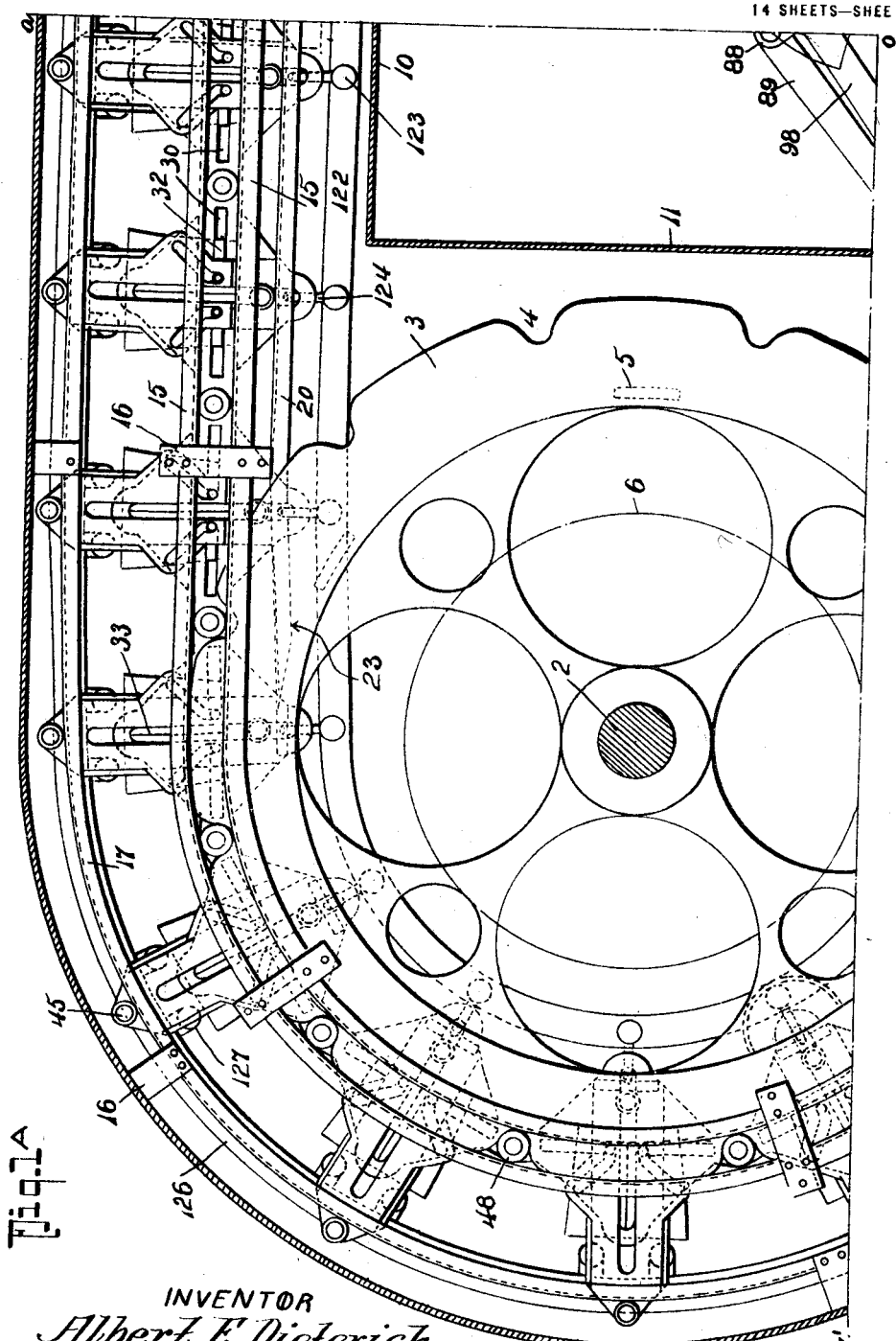

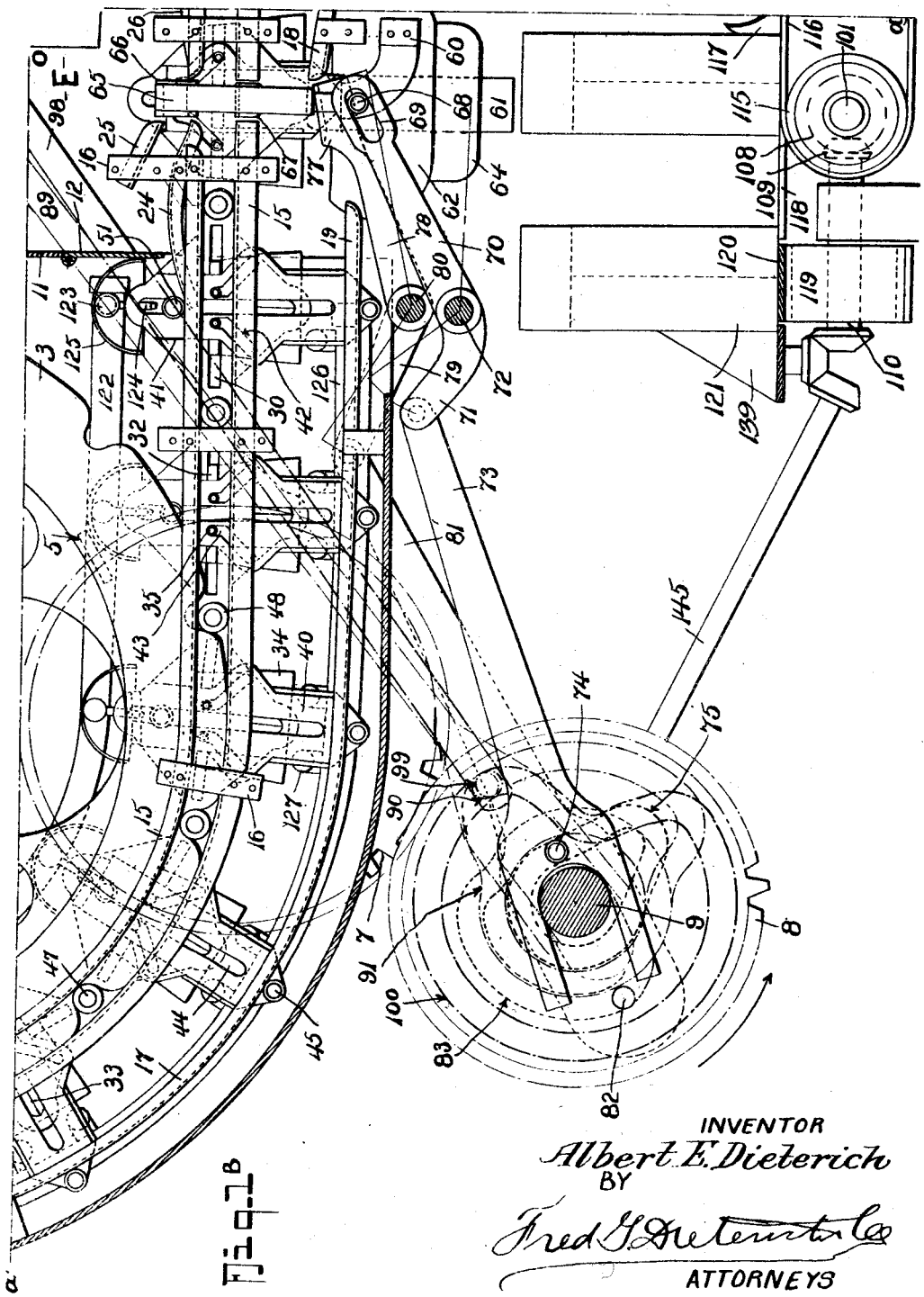

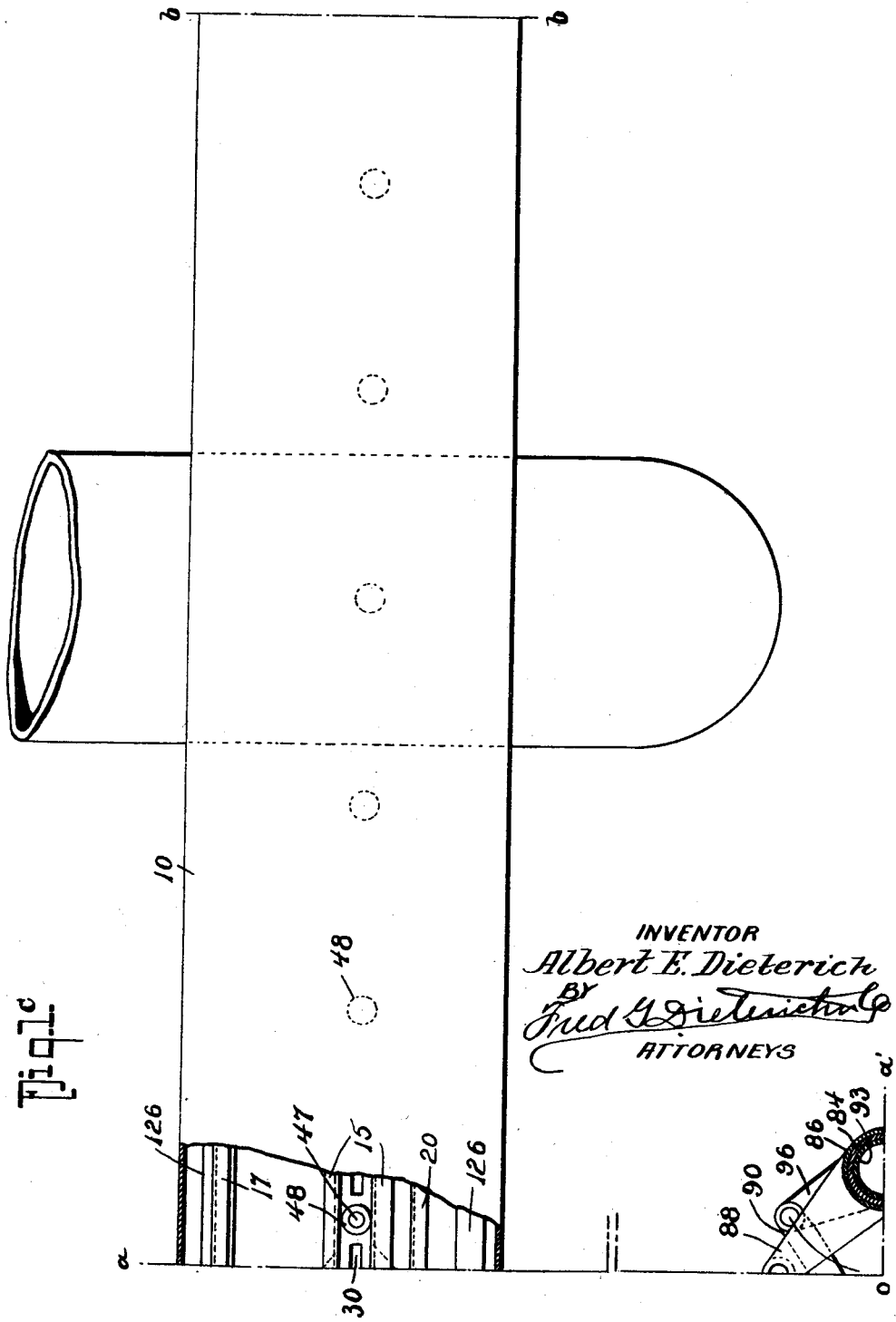

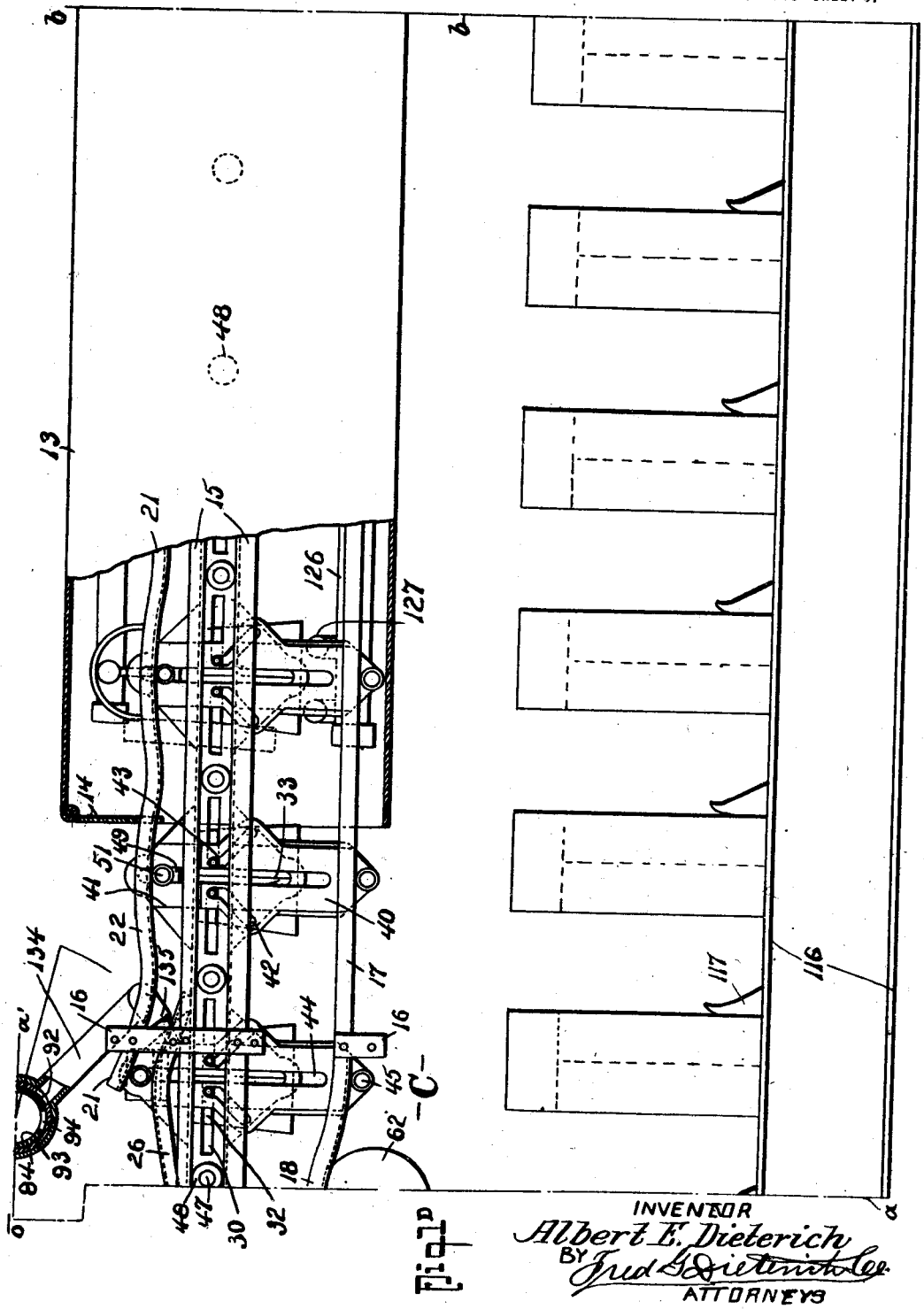

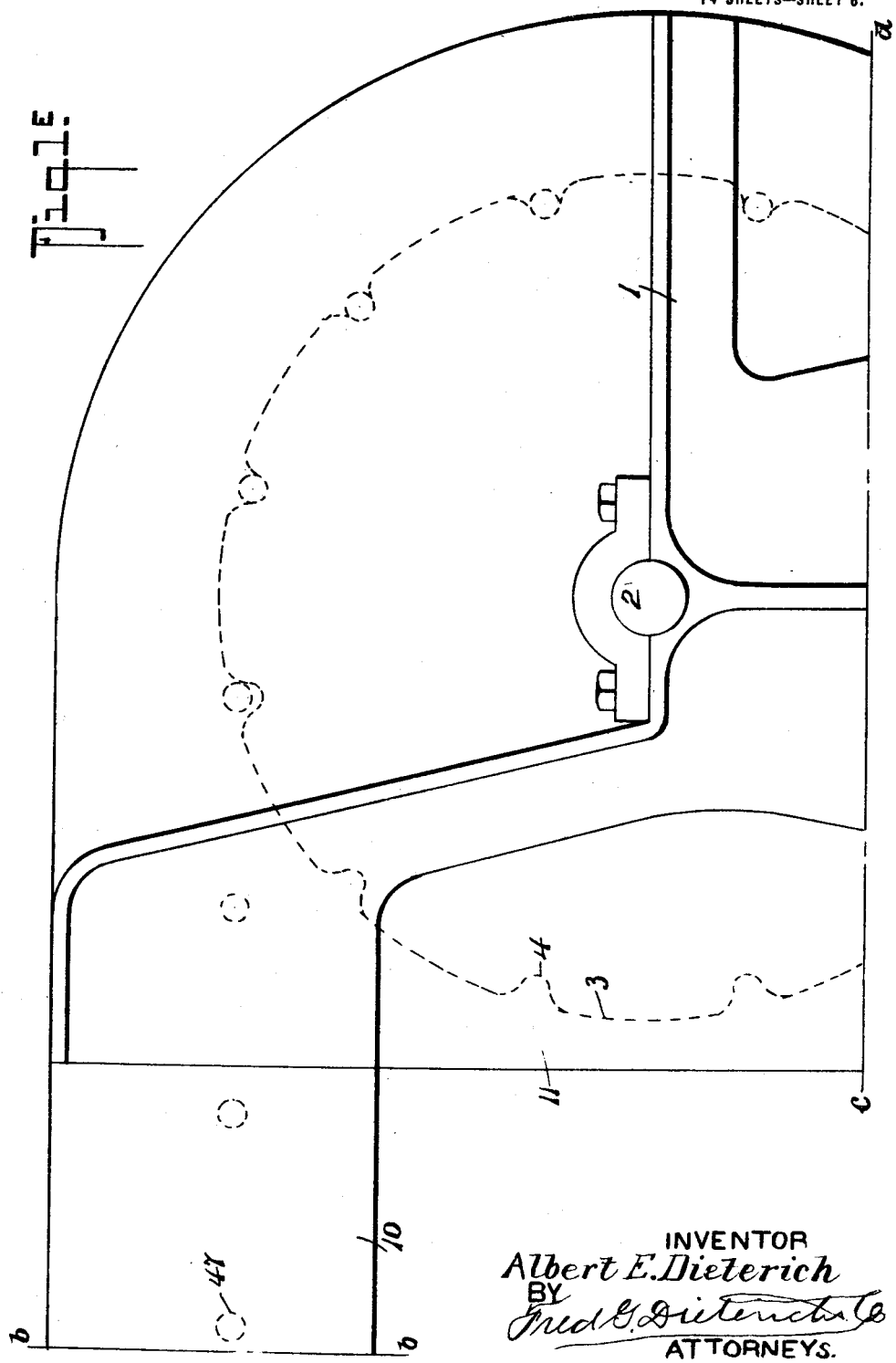

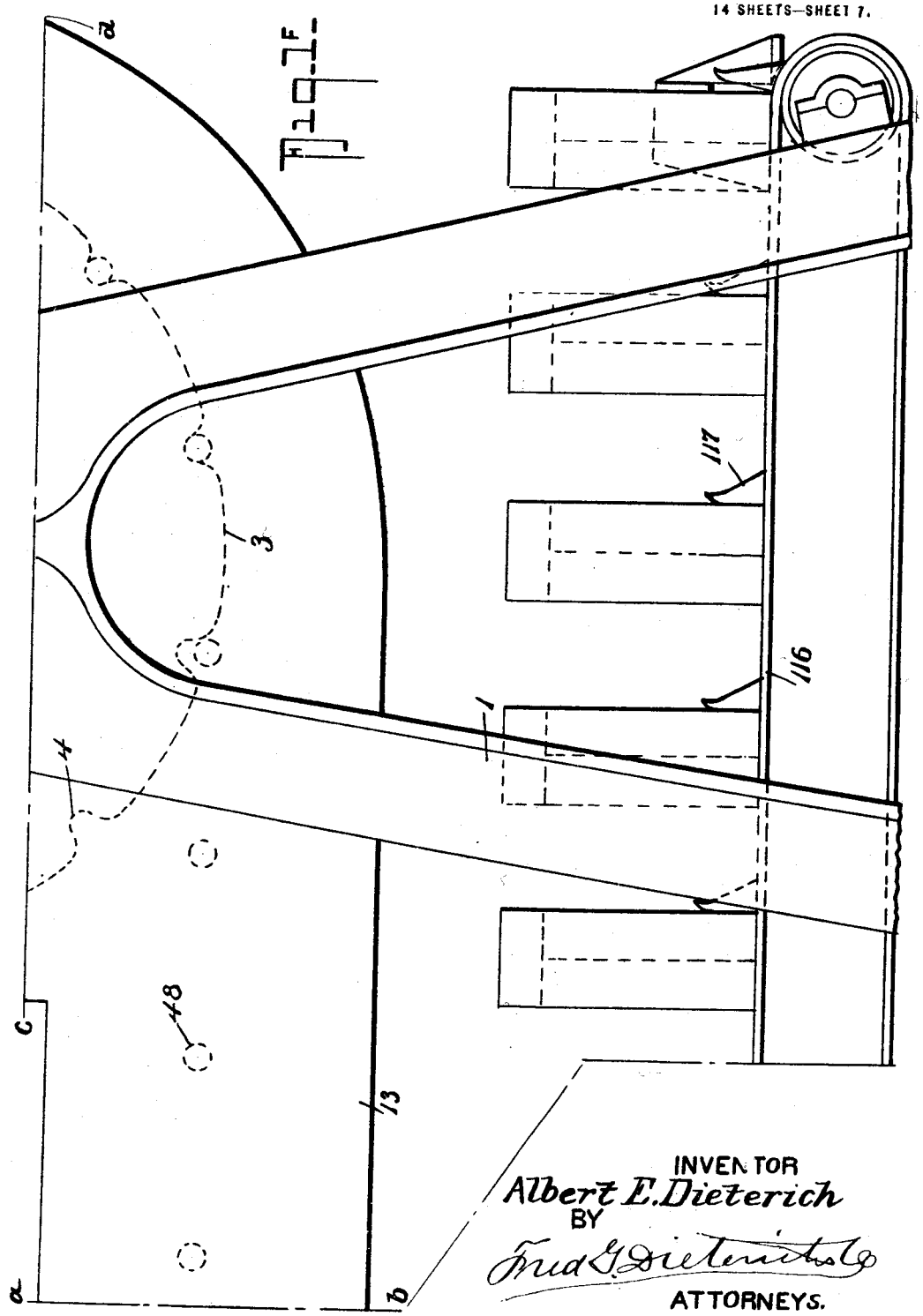

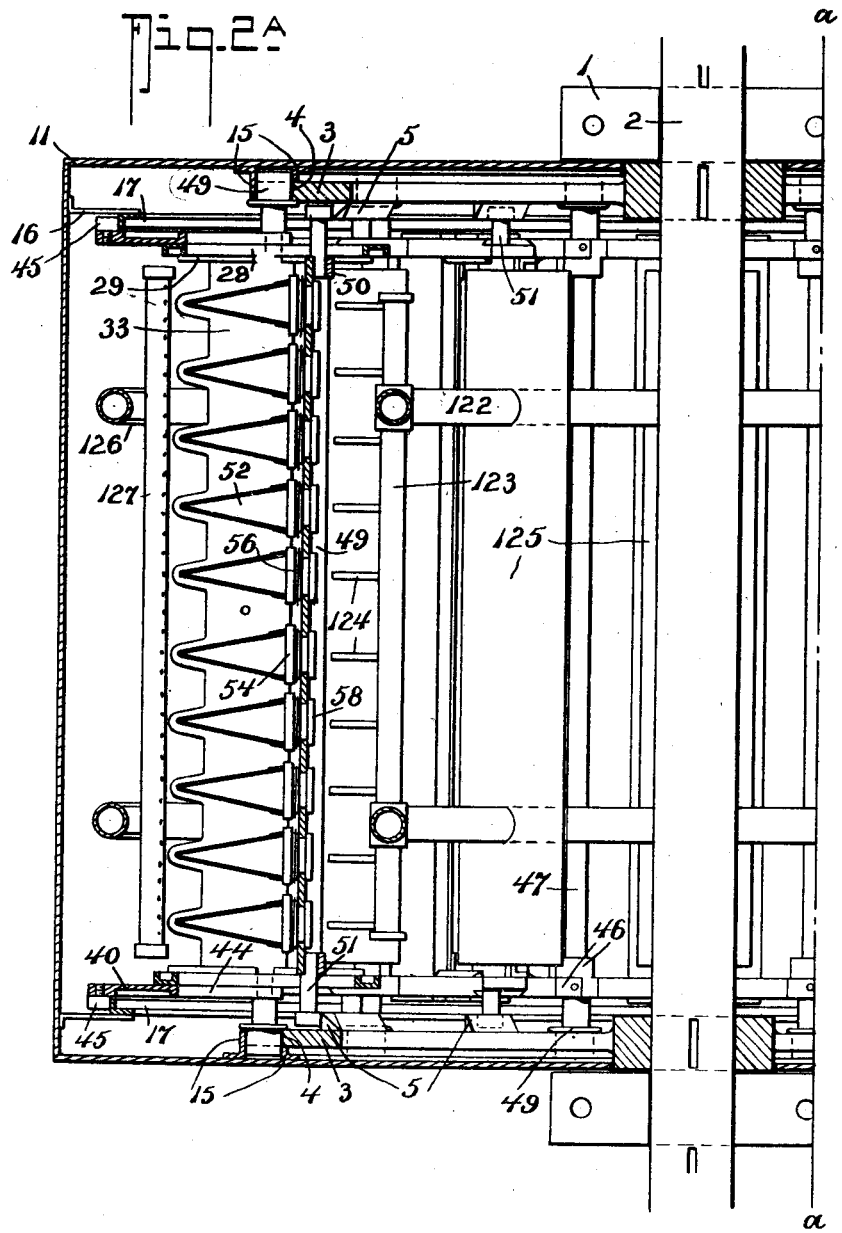

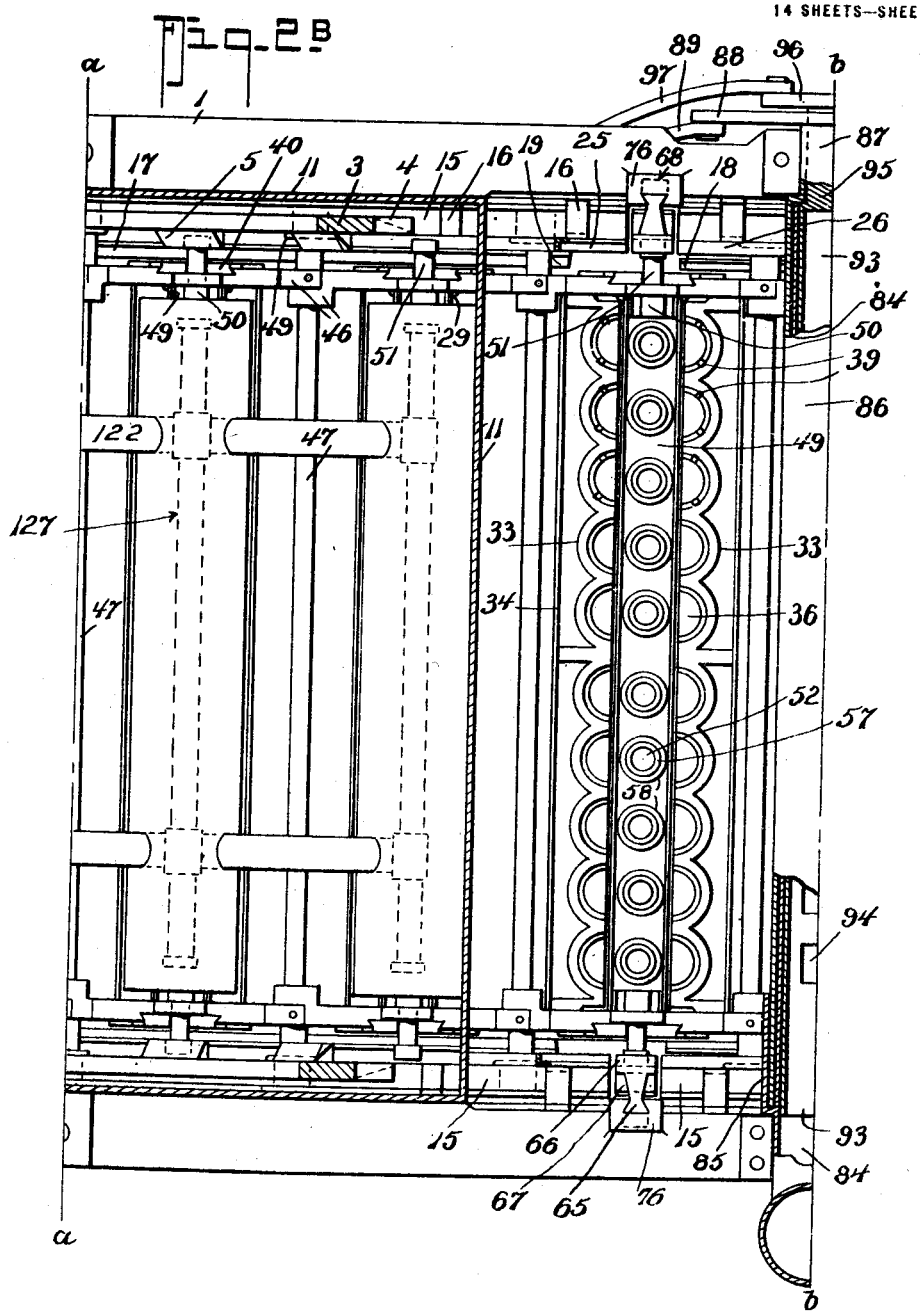

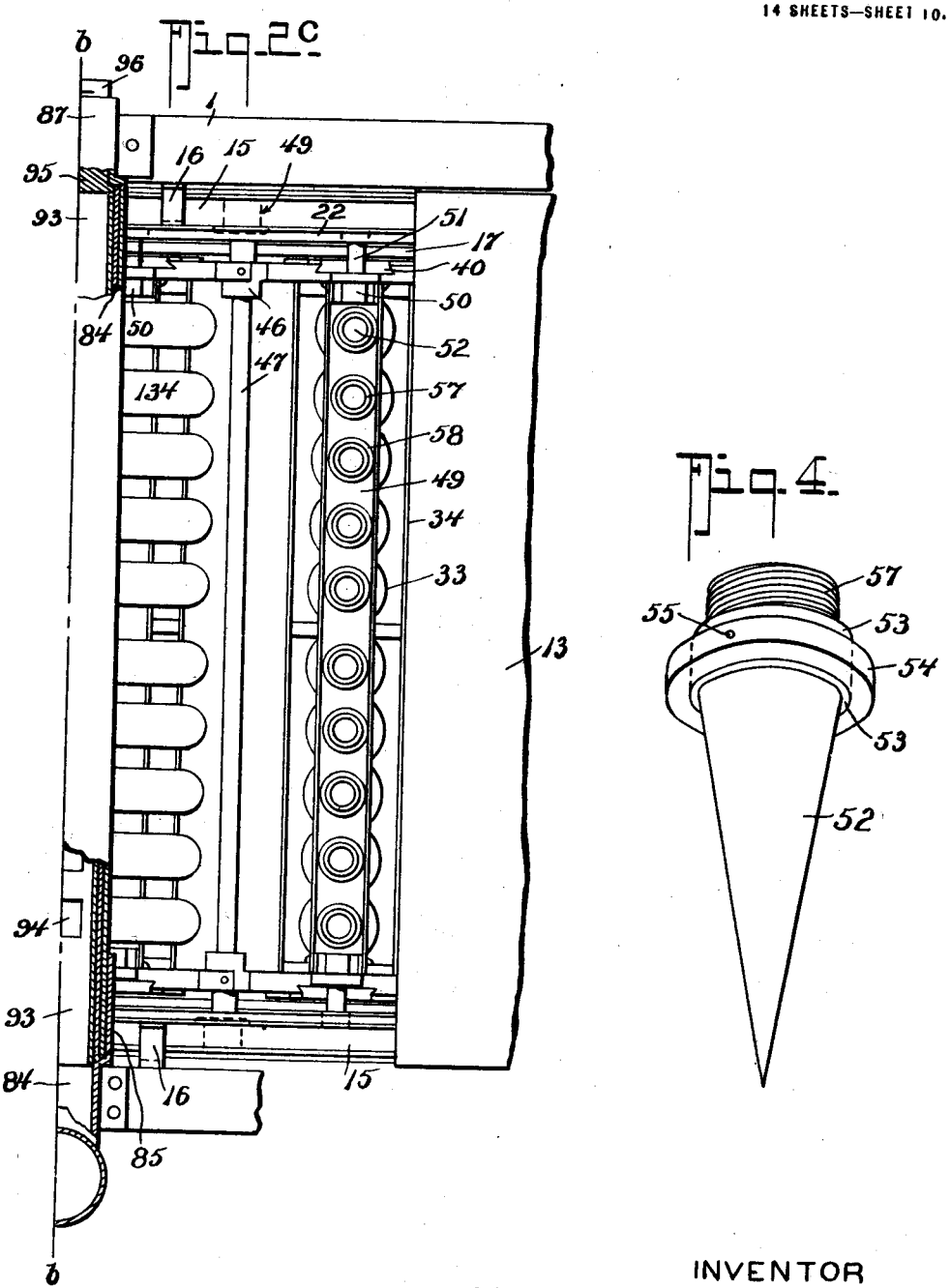

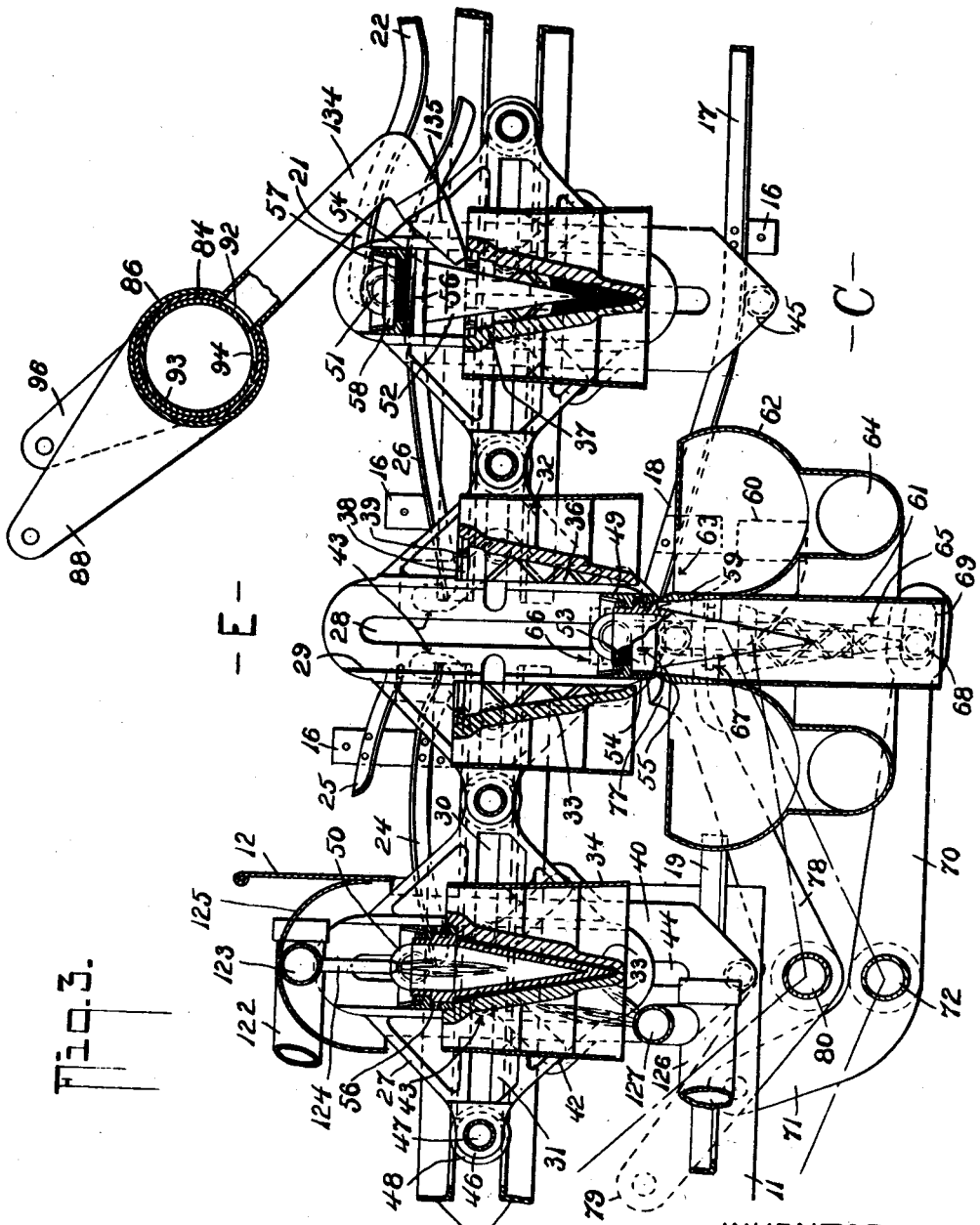

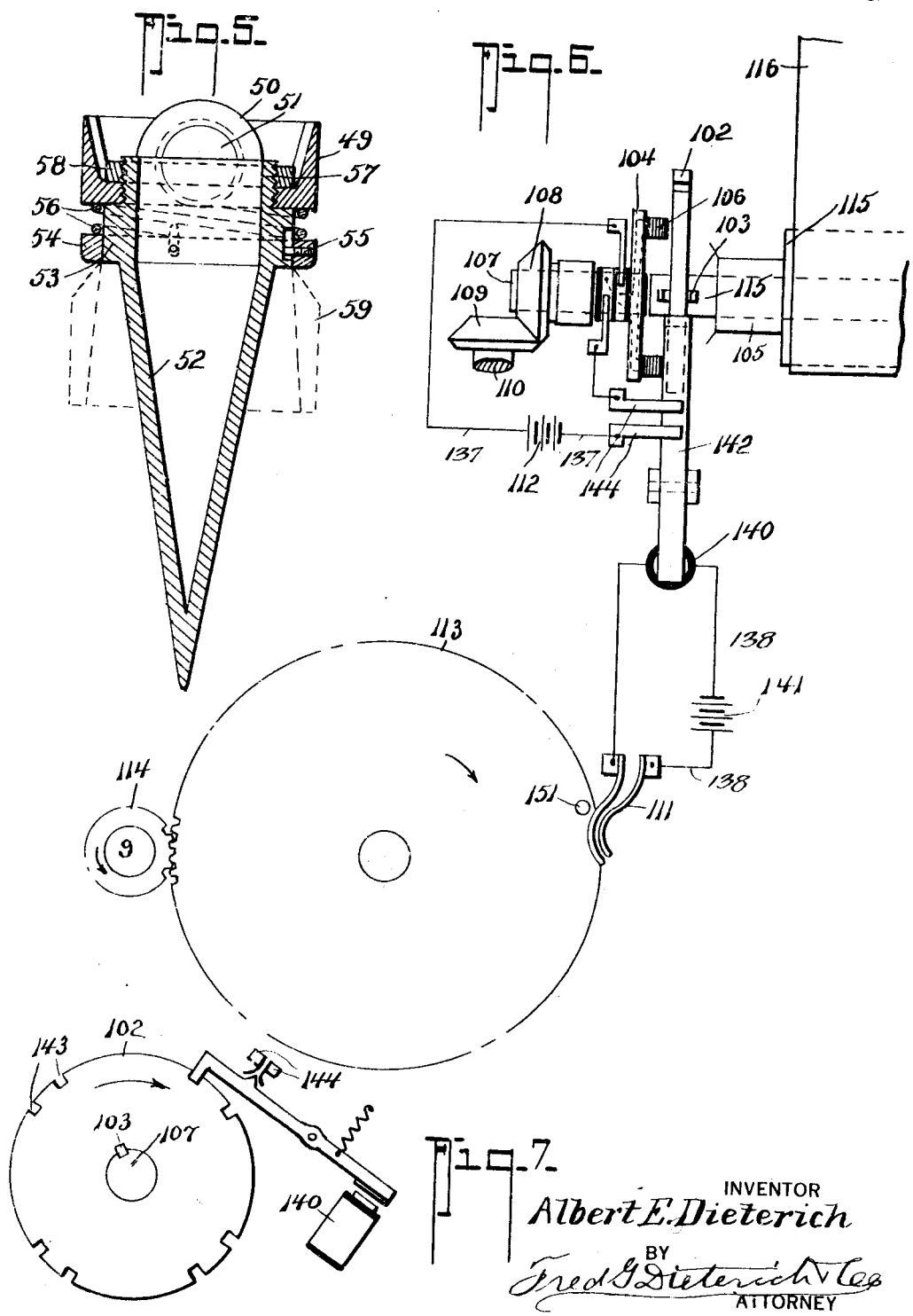

A. E. DIETERICH.
CUP PASTRY MAKING MACHINE.
APPLICATION FILED OCT. 1, 1917.

1,294,634.

Patented Feb. 18, 1919.
14 SHEETS—SHEET 13.

INVENTOR
Albert E. Dieterich.
BY
Fred G. Dieterich
ATTORNEYS

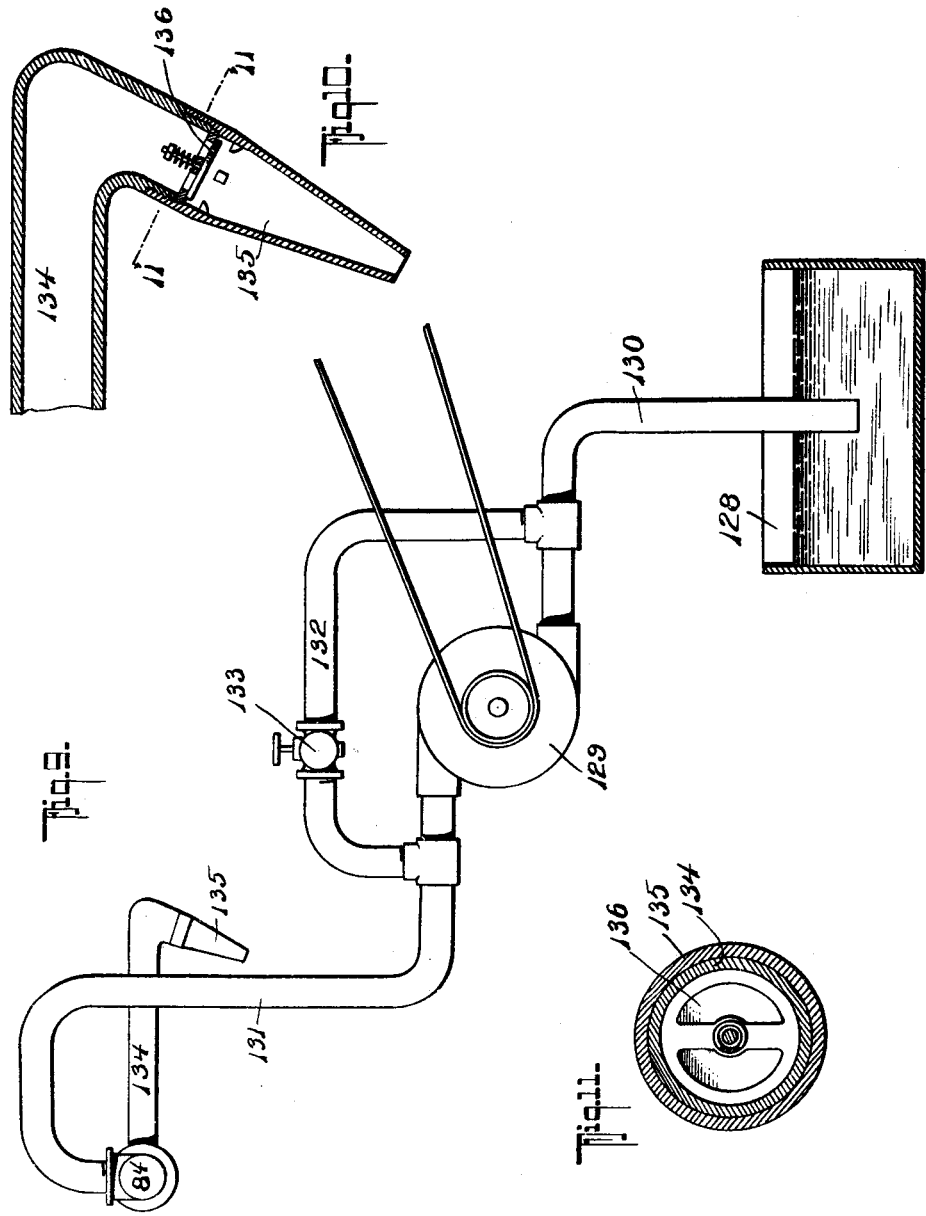

UNITED STATES PATENT OFFICE.

ALBERT E. DIETERICH, OF WASHINGTON, DISTRICT OF COLUMBIA.

CUP-PASTRY-MAKING MACHINE.

1,294,634.　　　Specification of Letters Patent.　　Patented Feb. 18, 1919.

Application filed October 1, 1917. Serial No. 194,194.

*To all whom it may concern:*

Be it known that I, ALBERT E. DIETERICH, a citizen of the United States, residing in the city of Washington, District of Columbia, have invented certain new and useful Improvements in Cup-Pastry-Making Machines, of which the following is a specification.

My invention relates to the art of cup pastry baking. In this art, cup pastry, such as pattie cups, ice cream cups and cones and other similar "deep dished" articles, are baked in molds having cavities to receive the batter and core elements coöperative therewith to shape the dough into the desired form the article is to assume. In the beginning of the art it was the practice to make the molds with a single section bed structure in which the cavities were formed. An example of this structure may be found in the United States patent to Valvona #701,776, issued June 3, 1902, or in the later patent to Baker, #712,473, issued November 4, 1902. With these constructions, however, the baked product had to be removed from the mold cavities by hand and only articles of substantially smooth exteriors could be successfully produced.

Later a machine was devised in which an attempt was made to remove the salient defects of the prior machines by providing means for removing the article, and this was done by providing a lifter grid over which the batter was flowed in the shape of a web which united the adjacent articles into a cupped sheet and after the cores were lifted the grid could be raised to lift the sheet of articles so that all the cups could be loosened from the mold cavities and removed, as a unit, by the attendant. An example of this construction may be found in the patent to Abrahams, #841,211, issued January 15, 1907. This type of machine, however, was not fully satisfactory for several reasons namely: It failed to provide for forming a product having an ornamental exterior, especially where raised ornamentation provided for transverse or diagonal ribbing, as such ornamental articles would not be pulled up out of the mold cavity. Again, it failed to provide for the elimination of handling the article in removing the same from the machine, a serious objectionable feature for sanitary reasons, and furthermore no provision was made for trimming or removing the web of batter that held the several articles of the cupped sheet together. This trimming had to be done manually which meant handling of the several articles.

Later, it was discovered that by making the female mold part of sections so that the sections could be separated transversely, and manipulating the core and mold sections in a certain peculiar sequence, any kind of ornamentation could be provided on the exterior of the article without affecting the facility of its withdrawal from the mold, that is,—the article could be ribbed with transverse or diagonal ribbing, as desired, and furthermore by the use of the divided or separate female mold and the peculiar sequence of operations resulting in the automatic extraction of the product, it was possible to mold the several articles in each cavity separately and not in the form of a cupped sheet and discharge such articles separately from the machine, or if the articles happened to be stuck together by over-flow batter they would be separated before being discharged from the machine. This type of machine also provided for trimming away the surplus batter and substantially eliminated any handling of the articles whatever. The primary machine embodying these features in the advance of the art, and which resulted in a great advance in the industry of making cupped articles, especially ice cream cones, is known as the Bruckman machine, the construction of which is substantially shown in Patent #1,071,027, issued August 26, 1913. Machines of the Bruckman type have today practically supplanted all other previously known machines.

The Bruckman machine, while making a great advance in the art, does not fully meet the ideal conditions, in that by reason of the location of the trimmer tubes to one side of the extraction station, and the necessity of shunting the cones from the extracting station to the tubes, makes the services of an attendant necessary at times to prevent the cones from tangling up in transit from the extracting station to the trimming tubes, and it further makes no provision for boxing the cones before they leave the machine proper (although a boxing apparatus has been recently provided for by Mr. Bruckman for attachment to the Bruckman machine which will largely eliminate this objection and certain improvements in the trimming mechanism have been made with a view of eliminating the objections above noted).

Again, the capacity of the Bruckman machine is necessarily limited by reason of the number of molds that can be put in a given circle.

My invention has for its object to provide an improved machine of the broad Bruckman type (i. e., that type in which the loading, baking, molding, extracting and trimming operations, etc., are automatically conducted and a machine which provides for the substantial elimination of handling of the product) in which provision is made for a greatly increased capacity, a greater uniformity in the quality of the product, the elimination of waste as much as possible, the elimination of all handling of the product and including its automatic placement into the shipping boxes before removal from the machine and the removal of the scrap from the machine in a clean and sanitary manner whereby the scrap may be utilized for human food consumption.

The present invention also makes provision for a positive removal of the article from the mold cavity, a positive guiding of the same directly into the trimmer tubes before it fully leaves the mold cavities and for positively forcing the article through the trimmer tubes and at the same time guiding it into the box compartment where it is to remain for shipment.

The invention also includes a novel method for removing the finished article from molds of the split type and for passing it through trimmer tubes before effecting a final discharge of the same. This method consists generally in utilizing the core for releasing the article from the mold sections, as in the Bruckman machine, and in addition thereto utilizing the core to direct the article into and push it through the trimmer tube.

Again, the invention has for its object to provide a machine of the Bruckman type embodying an endless chain section of mold units rather than arranging the same in a circular series and providing such endless chain series of mold units of an improved construction in the interests of efficiency and economy of operation, and to that end the invention includes a novel construction of molding unit forming a link in the chain of molds.

The invention also has for its object to provide an improved arrangement of heating devices whereby to effect a uniform application of heat to the molds and cores in order to bake the product to a uniform color both externally and internally.

Again, the invention has for its object to provide a construction in which the parts are arranged as simply as possible and of a design embodying maximum mechanical strength with minimum weight and with maximum efficiency of service.

The invention also resides in those novel features of construction, combination and arrangement of parts, all of which will be first fully described, then be specifically pointed out in the appended claims and illustrated in the accompanying drawings, in which:

Figure 1 is a side elevation illustrating the invention. Figs. $1^A$, $1^B$, $1^C$, $1^D$, $1^E$ and $1^F$, if taken together, illustrate a side elevation of the machine embodying the invention, parts being shown in section and parts broken away for purposes of illustration. Figs. $2^A$, $2^B$ and $2^C$, if taken together, illustrate a partial horizontal section through the axis of the mold chain sprockets.

Fig. 3 is an enlarged detail vertical section of three units showing the last baking unit, the unit at the extracting station and the unit at the loading or charging station.

Fig. 4 is a detail perspective view of one of the cores.

Fig. 5 is a transverse section through the core bar showing one of the cores, the trimmer cutter being indicated in dotted lines.

Fig. 6 is a view illustrating one manner of operating the clutch for the box conveyer.

Fig. 7 is a detail view of the escapement dog and the disk which is held by the magnets of the clutch disk in locking the driving shaft with the box conveyer shaft during the forward movement of the same.

Figure 8:
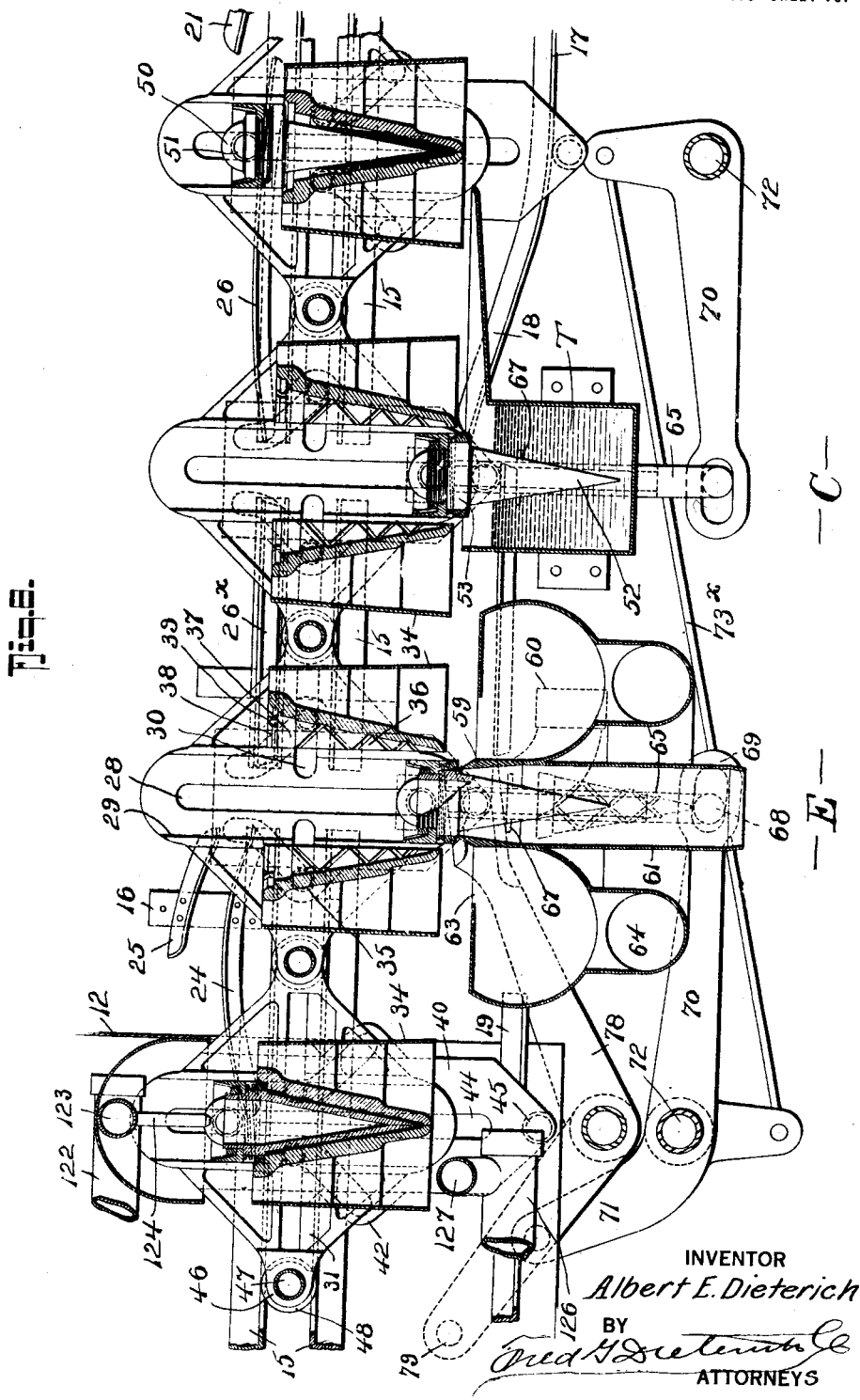

Fig. 8 is a view similar to Fig. 3 showing how the dipping method of loading molds may be employed. Fig. 9 is a detail diagrammatic view of the batter pumping mechanism. Fig. 10 is a detail section of the nozzle showing the back check valve. Fig. 11 is a cross section on line 11—11 of Fig. 10.

In the drawings, by joining the lines $a'$—$o$ of Figs. $1^A$ and $1^B$, the lines $a$—$o$ of Figs. $1^A$ and $1^B$ to the similarly designated lines of Figs. $1^C$ and $1^D$, and by joining the lines $o$—$a'$ of Figs. $1^C$ and $1^D$, and by joining the lines $b$—$b$ of Figs. $1^C$ and $1^E$ and by joining the lines $b$—$b$ of Figs. $1^D$ and $1^F$ and by joining the lines $c$—$d$ of Figs. $1^E$ and $1^F$, these figures may be read as one figure to show a complete side elevation of the machine, the parts being broken away to show the character of the hidden structure.

By joining the lines $a$—$a$ of Figs. $2^A$ and $2^B$ and by joining the lines $b$—$b$ of Figs. $2^B$ and $2^C$, these two figures may be read as one.

In the drawings also like numerals and letters of reference indicate like parts in all of the figures.

1 represents the main supporting standards which may be of any design or configuration that may be found convenient for supporting the structure and 2 designates the shafts which carry the sprocket wheels 3, there being a pair of sprocket wheels spaced apart and located on each of the shafts 2, between which sprocket wheels the molding units pass around the same in chain-like formation. The wheels 3 have recesses 4 to receive the roller bearing of the mold link connection shafts 47, the rollers 48 of which are adapted to seat in the recesses 4 as they pass around the wheels 3.

The wheel 3 also has flanged portions 5 to serve as core locks, while the mold units are passing around the arc of the wheel. 6, 7 and 8 designate the gear train which connects the first motion shaft 9 with one of the shafts 2 for the purpose of driving the mold chain and in order that the drive may be effected in step-by-step action, the gears 7 and 8 are provided with meshing mutilated sections and comprise a gear element of the Geneva type, the gear 7 having a double row of teeth, one mutilated for meshing with the gear 8 and the other unmutilated for meshing with the gear 6, the gear 7 having a series of mutilations equal in number to the number of mold unit sections of the wheels 3 so that each revolution of the gear 8 will impart a step to the gear 7 which will in turn impart a step to the wheel 3 of sufficient degree to move the mold unit from one space to the next.

10 designates the heat tunnel which is preferably in the nature of a sheet iron closure, the ends 11 of which incase the wheels 3, one of the ends 11 having an exit flap 12 that can yield outwardly to allow the molds to pass, the flap 12 serving to act as a heat retaining shield above the mold units and the entrance portion 13 of the tunnel 10 has a flap gate 14 for the same purpose.

15—15 designates the main guide rails of which there is a set at each side of the machine and these rails are continuous from the exit side of the extracting station to the entrance side of the same, being separated only at the extracting station to permit the core lowering devices to operate. The rails 15 are arranged in pairs and are tied together by brackets 16 which are secured to the tunnel 10 and main framing 1, where possible, to support the tracks 15 in a rigid manner. 17 is the mold locking track which has its entrance 18 arranged to effect the closing and locking action of the molds as they leave the extracting station, the terminal end 19 of the cam track 17 being preferably located between the extracting station and the last baking station so that the molds may not be accidentally unlocked until they leave the last baking station. While I prefer to have the cam track 17 continuous, yet it is obvious if the mold lock is constructed as shown the track 17 may be omitted at intervals, if so desired, especially where the tendency for the molds to self-open is zero.

20 designates the core locking cam which has an entrant end 21 preferably located approximate to the loading station so that as the molds leave the loading station the cores will be pressed down into the molds cavities to spread the batter to fill the same and following the entrant end 21, the cam track 20 is undulated, as at 22, to allow for steam or vapor escape during the initial part of the baking operation. The cam track 20 preferably extends from the loading station to the wheel 3 and at the top between the two wheels 3, the function of the track 20 being performed at the wheels by the flanges 5. The upper section of the cam track 20 terminates, as before stated, at 23, adjacent to each of the wheels 3.

24 designates the core lifter cams, the function of which is to raise the core slightly in the mold as it leaves the last baking station to loosen it from the product, and in my construction, I prefer to again lower the core into the mold by the time it arrives at the extracting station and in order to do this the cam 24 is depressed adjacent to the extracting station, and in order to insure the positive lowering of the cores, lowering cams 25 may be employed.

26 is the core raising cam which lifts the core as the molds pass from the extracting station, a considerable distance up from the molds so that by the time the charging station is reached, the core will be raised sufficiently to permit the dough supplying nozzle to come into position to squirt a charge of batter into the molds, (this is when the squirting method is employed, as will be hereinafter more fully explained).

Each molding and baking unit comprises a pair of links 27 having vertical slots 28 and guideways 29 for the operation of the core bar 49 and each link also has horizontal slots 30 and guideways 31 for the pins 35 and guide blocks 32 of the half-mold units 33. The half-mold units 33 are provided with the cavities 36 which, when the molds are designed for molding ice cream cones, consist of the corrugated portions 36 surmounted by the neck forming counterbore 37 and the core head recess 38, the latter being preferably provided with steam escapes 39, such as shown in the patent to Walter McLaren, #1232820 granted July 10, 1917.

Each half-mold member is preferably provided with a heat shield 34 between which and the sides of the molds 33, the heating burners 127 are adapted to project their flames.

40 designates the mold opening, closing and locking blocks which are vertically slidable in guideways 41 on the outer sides of the links 27, the blocks 40 having vertical slots 44 to permit passage of the core bar pintles 51, and the blocks 40 also have roller lugs 45 to engage the locking cam 17 and also to engage the grooved head 77 of the lever 78 hereinafter again referred to.

Each link 27 has lugs 46 through which the connecting rods or shafts 47 project and form a hinge for adjacent pairs of links, the rods 47 at their ends carrying rollers or wheels 48 that ride between the pairs of tracks 15.

The core bar 49 is preferably of a channel section and has bracket portions 50 at its ends to sustain the pintles 51, which pintles project through the slots 28 and 44 to coöperate with the cams 24, 25, 26, 21, 22, 20, etc., and the slotted head 66 of core lowering member 65 hereinafter again referred to. The cores 52 are preferably of the hollow type and are tapped at 57 into the core bar and secured by jam nuts 58, each core having its head formed of an integral portion 53 and a ring 54, the two portions 53 and 54 having pin and slot connections 55, a suitable spring 56 being interposed between the rings 54 and core bar 49 to normally maintain the ring 54 down on the member 53, whereby the lower surfaces of these two parts will substantially register.

59 designates the trimmer tubes which are supported on brackets 60 directly beneath the molds at the extracting station and as close thereto as conveniently possible, the trimmer tubes 59 being adapted to discharge into a throat 61 that in turn discharges the product directly into the boxes, in which the finished article is to be shipped.

62 is an inclosed hopper or pan which surrounds the trimmer tubes 59 and has an opening 63 adjacent to the tubes through which the trimmings may fall into the hopper 62 from which they are removed through a suction blower duct 64 and stacked at any suitable place, thus preventing the trimmings from falling to the floor and becoming contaminated. Furthermore, the hopper 62 protects the trimmings from oil drippings and dirt until they are conveyed away by the suction blower, thus enabling the trimmings to be kept clean and enabling their use for food for human consumption, since the trimmings are thoroughly baked and may be utilized in various ways as a food stuff.

65 designates the core bar lowering and raising slides which are located at the extracting station, there being one slide at each side of the machine. Each slide 65 has a slotted head 66 which is designed to receive the pintles 51 while the mold unit is at the extracting station and the slides 65 are vertically operated in stationary slideways 76 suitably supported by the main framing of the machine. The slides 65 also have track sections 67 which aline with the adjacent ends of the lower track rail 15 and bridge the gap between the ends of the same at the extracting station so as to enable the wheels or rollers 48 to pass over the gap during the advance of the mold chain from one station to the next.

Each slide 65 has a pin 68 operating in the slot 69 of a lever 70 (there being one lever at each side of the machine), the lever 70 being secured to a cross shaft 72 and having its ends 71 joined to the connecting rod 73 which has a cam pin 74 to operate in the core bar raising and lowering cam 75 that is secured on the shaft 9, it being understood that if the levers 70 are securely pinned to the shaft 72, but one connecting rod 73 and cam 75 need be employed.

77 designates the grooved end of a lever 78 (there being one lever at each side of the machine) which lever is secured to a cross shaft 80 and has its end 79 connected to the cam rod 81, the rod 81 having a cam pin 90 to operate in the mold opening and closing cam 83, it being understood that where the two levers 78 are securely pinned to the shaft 80 but one rod 81 and cam 83 need be employed, the object being to operate the levers 70—70 and 80—80 at the two sides of the machine in unison.

84 designates the batter duct into which the batter is pumped under constant pressure from a reservoir 128 by a suitable pump 129 through a duct 130—131, the pump 129 being bridged by a duct 132 which joins the duct 130—131 at the opposite sides of the pump, and serves as a by-pass for the batter whereby the batter may be supplied to the tube 84 at constant pressure and for that purpose a pressure regulating valve 135 is interposed in the duct 132.

The tube 84 is securely clamped to the main framing 1, or in any other way suitably supported in a rigid position, and it has a collar 85 which is adapted to project over the end of an outer tube 86 which has a telescopic fit on the tube 84. The tube 86 carries the several nozzle arms 134, and has a rotary motion on the tube 84 as an axis. This is accomplished by providing the tube 86 with a bearing collar 87 suitably journaled in a support which may be a part of the main frame, and which has a lever 88 that is rocked by the action of a cam 91 through the medium of a connecting rod 89 whose pin 90 coöperates with the cam 91, the rod 89 being mounted for longitudinal motion.

At proper intervals the connecting rod 89 is reciprocated to move the arms 134 to bring the nozzles 135 into the loading position (see Fig. 3) at which time the entrant end of the arms 134 will register with the opening 92 which is formed in the tube 84, it being understood that there is one opening 92 for each arm 134. Each nozzle 135 is preferably provided with a light back check valve 136 of a sufficient force only to hold the batter within the arm 134 against dripping after the valve 93 is closed.

93 designates the valve which has openings 94 to register with the openings 92 at intervals and this valve 93 is also in the nature of a tube which fits snugly within the tube 84 and has a closed end 95 to form a bearing in the collar 87, and this end 95 carries a crank 96 to which the cam rod 98 is connected, the cam rod 98 having a pin 99 to coöperate with the valve cam 100. The tube 93 has its other end 97 open so that the batter from the tube 84 enters the valve 93 and the batter in the valve 93 is maintained at a constant pressure, as before stated.

101 designates the driving shaft of the box conveyer 116, which conveyer is in the nature of a non-slipping belt or chain having box engaging fingers 117 located at suitable intervals apart and the conveyer 116 takes over the pulleys 115.

105 designates a bearing for the shaft 101 and 102 is a clutch plate slidably keyed at 103 to the shaft 101 and adapted to be gripped by a suitable clutch on the power shaft 107. I prefer, for convenience, to provide a magnetic clutch 104 energized at intervals in order to effect a step-by-step action of the belt 116. In order that this action may be accomplished in a step-by-step manner, I provide a gear train 114—113 connected with the first motion shaft 9, the gear 113 having a pin 151 which is adapted to close an electric circuit between a pair of contacts 111 to which the wires 138 from a magnet 140 are joined, it being understood that a suitable source of energy 141 is included in this circuit. The magnet 140 is designed to release an escapement lever 142 which coöperates with notches 143 in the clutch disk 102 and as the magnet 140 is energized to rock the lever 142 it closes a circuit between a pair of contacts 144 which are connected by circuit wires 137 to clutch magnets 106, a source of energy 112 being included in the circuit for energizing purposes. Clutch 104 is carried on shaft 107 which is gear connected at 108—109 with the shaft 110 of a continuously operating transverse conveyer 120 whose drive pulley 119 is on the shaft 110 and which serves to take the filled boxes out of the machine 121, having a stop 139 (see Fig. 1.) against which the boxes are delivered by the conveyer 116, passing them over the bridge 118 onto the conveyer 120. Shaft 110 is continuously driven in any desired manner, from the first motion shaft 9 of the machine, as by a transmission shaft 145, or in any other suitable manner, the arrangement being such, however, that the conveyer 116 is advanced at suitable intervals, depending upon the operation of the other parts of the machine.

Where the boxes are intended to hold one hundred cones and each mold is designed to mold ten cones at a time, the boxes are provided with two rows of five compartments each, each compartment being designed to hold ten cones, making a total of fifty cones for each box; thus it will be necessary to provide two boxes in transverse alinement to be located under the extracting station at the same time and every time the shaft 9 makes ten revolutions, the conveyer 116 will be advanced one step. In order that the proper intervals between the steps may be obtained the notches 143 in the disk 102 are spaced to correspond with the intervals, the intervals being first a step from one nest of a box to the other, and then a step from the second nest of that box to the first nest of the next box, being a short and a long interval, which will be more fully explained hereinafter.

Instead of using a squirting apparatus for charging the molds, I may use the dipping method and this can be accomplished by beginning the track 17 after the charging station so as to leave the half-molds open as they pass from the extracting to the charging station and by duplicating the slides 65 at the charging station and by providing a duplicate lever mechanism 70 at the charging station so as to lower the cores at the charging station into a stationarily held dipping tank, the arms 70 at the charging station operate in unison with the arms 70 at the extracting station the female molds closing on leaving the extracting station, closure being effected by the entrant end of the cam track 17, thus giving sufficient time for the drip from the cores to discontinue before the mold halves are finally closed around the cores to hold the cone. This structure is illustrated briefly in Fig. 8 of the drawings, the duplicate levers 70 being operated by the connection 73ˣ, the dipping tank being indicated by the reference character T.

In the drawings, the extracting station is indicated by the letter E and the charging station by the letter C.

The manner in which the machine operates will be best understood by reference to Fig. 1, from which it will be seen that after the mold has arrived at the charging station, the half-mold members will be closed and locked and the cores will be elevated by the cam 26. As the mold unit approaches the charging station from the extracting station, the cam 91 will begin to lower the nozzles 135 into the position shown best in Fig. 3 and by the time the mold unit has arrived at the charging station the arm 134 will have come to the position whereby it will register with the opening 92 in the tube 84 (see Fig. 3). As soon as the mold unit has arrived at the charging station the cam 100 will quickly rock the valve tube 93 to bring the opening 94 into register with the opening 92 and permit a charge of batter to be squirted into the mold unit (see Fig. 3) and then the said cam will quickly close the valve opening 94 after which the cam 91 will rapidly rock the tube 86 to move the arms 134 upwardly and bring the nozzles 135 high enough to clear the top of the core bar 49 by the time the same shall have arrived under the nozzles, it being understood that the advancing movement of the chain can commence before the nozzles 135 are fuly elevated. In other words, the elevating movement of the nozzles and the advancement of the chain of molding units can be overlapped. This is in the interest of speed of operation.

The mold with its charge of batter then passes through the entrance to the entrant end of the baking tunnel and comes under the influence of the core and mold heat supplying burners. On passing from the charging station the core bar is lowered by the undulated portion 22 of the core locked cam 20 and raised by the pressure of escaping steam and gas throughout a sufficient interval of time to permit of the escape of the gaseous products before the core is finally locked down under the straight portion of the cam track 20. The molds then pass around through the baking tunnel to the exit end of the same, all the while being subject to the influence of heat for baking purposes. As the mold unit leaves the exit end of the baking tunnel, the core bar is slightly raised by the cams 24, the half-mold members being still locked together, and thus the core is freed from the baked product which is held in the female mold by virtue of the corrugations or filigree work or relatively greater roughness of the wall of the female mold than that of the core. In the preferred arrangement, the cores, after being slightly raised, are held projected into the mold cavity until the female mold elements are separated, whereby the projecting core will strip the cones from the opening mold elements.

As the mold unit approaches the extracting station the rollers 45 of the mold slide block will enter the groove-way 77 of the arms 78 and the female molds will begin to open up by virtue of the action of the cams 83, the said molds being fully opened by the time the mold unit has reached the extracting station, As soon as the female molds have opened sufficiently far for the purpose, the core, acting as a finger, serves to detach the cone from the female mold cavity walls, and by the time the mold unit reaches the extracting station, the core bar will have its pintles 51 in engagement with the slotted heads 66 of the slides 65, which slides, as soon as the female molds are opened wide enough, are brought down by the action of the cam 75, to follow the released cone (and if it sticks at all to push it through the female mold) and direct the released cone into the trimmer tube 59, further downward movement of the core bar serving to bring the head of the core into engagement with the trimmer tube and the yielding ring portion of the head, together with the downward movement of the core, will serve to push the cone through the trimmer tube and trim off the excess batter or "head," the trimmings thereupon falling into the receiver 62 and being drawn off by suction and stacked at any convenient location. As soon as the core has reached the limit of its downward movement it is immediately again elevated to its initial position and as soon as the core has elevated sufficiently to permit the half-mold members to come together, the chain begins to move another step so as to carry the mold unit from the extracting station to the charging station where it receives its new charge, as before described, the molds being closed in transit between the extracting and the charging stations, when the pumping or squirting method of supplying batter is employed. The core is also elevated in passing from the extracting to the charging station to allow the injection of the batter. When, however, the dipping method of supplying batter is employed, the core bar will simply be held to travel horizontally from the head 66 of the slide 65 at the extracting station to the corresponding head at the charging station and in this form of the invention the member 26$^x$ will be a straight track instead of a cam track and the entrant end 18 of the core locking cam track 17 will be located at the out-going side of the charging station rather than at the out-going side of the extracting station.

In order to impart an intermittent motion to the chain I prefer to employ a Geneva or mutilated gear movement as this is not only a convenient way to advance the chain but it also serves to lock the chain with the mold units at the several operating stations.

As soon as a predetermined number of cones have been guided through the trimmer tubes and into the boxes beneath, the boxes are advanced as before described, so that the next compartment in order may be filled.

While the drawings illustrate a preferred construction of my invention, I desire it understood that numerous changes in the details of construction, proportion and arrangement of parts may be made without departing from the spirit of the invention or the scope of the appended claims and greater or lesser number of units may be employed as may be found most desirable in practice. Furthermore, the number of cones baked by each unit is not to be considered as limited, as any number, from one cone per unit up, can be baked in a set of molds as may be found most convenient in practice.

Any suitable vent holes may be provided in the tunnel 10 as conditions met with in practice may indicate to be desirable and as that is a mere mechanical detail I have not described the same nor do I make any detail claim thereto.

While the flanges 5 on the wheels 3 have been indicated as short sections, yet it is obvious that the same may be a continuous flange, if desired, although only that portion intermediate the notches or recesses 4 ever comes into active engagement with the core bar pintles of the molding units.

While I have indicated an electrically controlled means for imparting intermittent motion to the box feeding conveyer yet I desire it understood that mechanical devices for this purpose may be provided if found more desirable.

In practice, I contemplate providing a number of machines arranged parallelly side by side with a single transverse conveyer running beneath all of the machines at a considerably greater rate of speed than the feeding of the boxes from the infeed conveyers onto the off-take conveyer so that one transverse conveyer can take off the boxes from the entire set of machines and furthermore one fan or blower can be employed with a plurality of machines so that the trimmings from all machines of the plant can be drawn off and gathered at a single place of location in a clean and sanitary manner.

By my construction, it will be observed that as the cores, at high temperature, come into contact with the entrance end of the trimmer tube, the conducted heat might soon cause the trimmer tube to lose its temper or to get so hot as to injure the cones, but by using the suction device, the trimmer tube is kept cool at the point where it receives the greatest conducted heat. This is an added advantage of the use of pneumatic suction for the removal of the trimmings.

In this application, I make no claim to the chain carrier for the molds, *per se*, apart from the other features of the invention as the mold carrier chain, *per se*, will form the subject matter of another application.

When I refer to the molds being locked, I do not wish to be understood as thereby limiting the locking function to any particular degree except that the molds shall be locked with sufficient pressure to maintain their opposing faces in contact for a time and to a degree sufficient to prevent their separation during the normal functioning of the machine and thereby prevent the formation of fins on the cones while the machine is operating under normal conditions.

From the foregoing description, taken in connection with the accompanying drawings, it is thought the complete construction, operation and advantages of my invention will be readily understood by those skilled in the art.

While I have especially described my invention as applied to cone baking machinery yet I desire it understood that I do not limit the same to the making of cones, nor do I limit the method of freeing the article from the molds to molds adapted to bake cones, as the invention is equally as well adapted for use in connection with the forming of other cup pastry of similar nature.

What I claim is:—

1. In a machine of the class described, molding and baking devices which comprise separable female molds and a core therefor, a trimmer tube, means for separating said female members and means for passing said core between the separated members to push an article through the trimmer tube.

2. In a machine of the class described, a traveling series of molding and baking devices each of which comprise separable female mold members and cores therefor, a trimmer tube, means for separating said female mold members and means for passing said cores between the separated members to push the article into and through the trimmer tube.

3. In a machine of the class described, a traveling series of molding devices, means for impelling said molding devices past an extracting and a charging station, a trimmer tube located at the extracting station, a charging apparatus located at the charging station, said molding devices each comprising a sectional female mold unit and a core therefor, means for supporting said unit and said core, means for holding said female sections and said core close together during their active article forming period, means for detaching said core from the product as it approaches the extracting station, means for opening the female mold sections as the extracting station is reached to release the product, and means for moving the core between the open female mold sections and projecting it into the trimmer tube to convey the product through said tube to trim the same.

4. An endless series of baking mold units which comprise a sectional female mold and a core therefor, mechanism for normally holding the female mold sections locked together with the core in place, means for causing said molds to travel past an extracting station and a charging station, a receiver at the extracting station, a batter supplying mechanism at the charging station, means for withdrawing the core while at the charging station sufficiently to permit said charging mechanism to function, means for operating said charging mechanism, means for holding the cores locked in the respective molds a sufficient time for the mold content or product to become "set", means for heating the mold units after they leave the charging station, means for opening the mold units to dislodge the content at the extracting station, and means to move said core between the opened female mold sections at the extracting station to guide the dislodged product into the receiver.

5. A series of baking mold units each comprising a sectional female mold and a core therefor, mechanism for normally holding the female mold sections together with the core in place, means for causing the said molds to travel past an extracting station and a charging station, a batter supplying mechanism at the charging station, means for withdrawing the core while at the charging station sufficiently to permit said charging mechanism to function, means for operating said charging mechanism, means for holding the cores down in the respective molds a sufficient time for the mold content or product to become "set", means for heating the molds units after they leave the charging station, means for opening the mold units to dislodge the content at the extracting station, a receiver having a trimming entrance at the extracting station, and means to move said core between the open female mold sections at the extracting station to guide the dislodged product into the receiver and push the same through the trimming entrance of the receiver.

6. A series of baking mold units each comprising a sectional female mold and a core therefor, mechanism for normally holding the female mold sections together with the core in place, means for causing said molds to travel past an extracting station and a charging station, a batter supplying mechanism at the charging station, means for withdrawing the core while at the charging station sufficiently to permit said charging mechanism to function, means for operating said charging mechanism, means for holding the cores in the respective molds a sufficient time for the mold content or product to become "set", means for heating the mold units after they leave the charging station, means for opening the mold units to dislodge the content at the extracting station, a receiver having a trimming entrance at the extracting station, means to move said core between the open female mold sections at the extracting station to guide the dislodged product into the receiver and push the same through the trimming entrance of the receiver, said receiver comprising a tubular body having provision for trimming the product as it passes through the same.

7. A chain of baking mold units each comprising a separable-section female mold and a core therefor, a locking device for holding the female mold sections closed, mold lock camming devices, core camming devices, batter charging mechanism, an article receiver, and mechanism for effecting relative movement between said mold units on the one hand, and said camming devices, said charging mechanism and said receiver on the other hand, whereby the same will function at intervals, said mold lock camming devices functioning to unlock the molds and open the same when the respective mold units are in position with relation to the receiver, and mechanism for moving the respective core between the open female mold members to direct the released article into the receiver.

8. A chain of baking mold units each comprising a separable-section female mold and a core therefor, a locking device for holding the female mold sections closed, mold lock camming devices, core camming devices, batter charging mechanism, an article receiver, and mechanism for effecting relative motion between said mold units on the one hand, and said camming devices, said charging mechanism and said receiver on the other hand, whereby the same will function at intervals, said mold lock camming devices functioning to unlock the molds and open the same when the respective mold units are in position with relation to the receiver, and mechanism for moving the respective core between the open female mold members to push the released article into and through the mouth of the receiver.

9. In combination with a set of molding and baking devices, a set of trimming tubes, a box conveyer adapted to deliver boxes to and from the trimming tubes; of a mechanism for effecting operation of said molding devices to release the product from the molds and cause a part of said molding devices to deliver the product to and through said set of trimming tubes whereby the same is discharged into the boxes.

10. In combination with a series of sets of molding and baking devices, a set of trimming tubes, a box conveyer adapted to deliver boxes to and remove the same from the trimming tubes, means for opening said molding devices to release the product, and means for projecting the product out of the molding devices directly into and through said trimmer tubes and into the boxes.

11. In combination with a series of sets of molding and baking devices, which include cores, a set of trimmer tubes, a box conveyer adapted to deliver boxes to and receive the same from the trimmer tubes, means for opening said molding devices to release the product, means for directing the product out of the molding devices to and through said trimmer tube and into the boxes, said last named means comprising instrumentalities for moving the cores through the open molds to lie projected into the released article to direct the released article into the trimmer tubes and push the same through.

12. In combination with a series of sets of baking molds each including separable sections, and cores therefor, a single set of trimmer tubes, means for opening and closing said separable sections, and means for moving said cores through the open molds to direct the product into the trimmer tubes and push the product into the trimmer tubes, and means for effecting relative travel between said series of sets of baking molds and the trimmer tubes.

13. In combination with a series of sets of baking molds each including separable sections and cores therefor, a single set of trimmer tubes, means for opening and closing said separable sections, a box conveyer for directing boxes to and moving the same from the trimmer tubes, and means for moving said cores through the open molds to direct the product into the trimmer tubes and push the product through the trimmer tubes whereby the product will be guided into the boxes.

14. A baking mold unit comprising a pair of links, cross members connecting the ends of the pair of links, said links having mold guideways and a core bar guideway, half-mold members mounted between said links and movable in said mold guideways, a core carrying bar movable in said core bar guideway, mold opening, closing and locking slide blocks mounted on said links and having coöperative connection with said half-mold members.

15. A baking mold unit comprising a pair of links, cross members connecting the ends of the pair of links, said links having mold guideways and a core bar guideway, half-mold members mounted between said links and movable in said mold guideways, a core carrying bar movable in said core bar guideway, mold opening, closing and locking slide blocks mounted on said links and having coöperative connection with said half-mold members, said slide blocks having slots, and said core bar having projections passing through said slots whereby when said half-molds are separated said core bar may be moved in between the half-molds.

16. In a machine of the class described, an oven tunnel, heat generating instrumentalities in said tunnel, said tunnel having an entrance and an exit, an endless chain of baking mold units adapted to pass through said tunnel, means for sustaining said chain in a definite path of travel through said tunnel, means for imparting motion to said chain, there being places outside of said tunnel known as an extracting station and a charging station past which said chain of mold units travels, said mold units severally comprising separable female sections and cores therefor, means operable at the extracting station for opening said female mold sections and projecting the cores therethrough to release the baked product, means at the charging station for charging the molds with batter, and means for locking the molds and the core during a sufficient period of their travel until the batter shall have become set.

17. In a machine of the class described, an oven tunnel, heat generating instrumentalities in said tunnel, said tunnel having an entrance and an exit, an endless chain of baking mold units adapted to pass through said tunnel, means for sustaining said chain in a definite path of travel through said tunnel, means for imparting motion to said chain, there being places outside of said tunnel known as an extracting station and a charging station past which said chain of mold units travels, said mold units severally comprising separable female sections and cores therefor, means operable at the extracting station for opening said female mold sections, a trimmer tube at the extracting station into which the product is adapted to be received from the molds, and means for moving the cores to force the articles through the trimmer tube.

18. In a machine of the class described, an oven tunnel, heat generating instrumentalities in said tunnel, said tunnel having an entrance and an exit, an endless chain of baking mold units adapted to pass through said tunnel, means for sustaining said chain in a definite path of travel through said tunnel, means for imparting motion to said chain, there being places outside of said tunnel known as an extracting station and a charging station past which said chain of mold units travels, said mold units severally comprising separable female sections and cores therefor, means operable at the extracting station for opening said female mold sections, a trimmer tube at the extracting station into which the product is adapted to be received from the molds, means for sustaining a box beneath the trimmer tube, and means for moving the cores at the extracting station to force the articles through the trimmer tube whereby the article will be guided into the boxes.

19. In a machine of the class described, an endless chain composed of baking mold units each comprising pairs of side links hinged together to adjacent links, separable female mold sections sustained by and between each pair of links, a core carrying bar also sustained by and between each pair of links, mold opening and closing slides sustained by each link and coöperatively connected with the respective female mold sections, means for imparting motion to said chain to move the units past a charging station and an extracting station, means for loosening the core from the baked product, means for operating the mold slides to separate the female mold sections, and means for moving the core between the separated sections to eject the product.

20. In a machine of the class described, an endless chain composed of baking mold units each comprising pairs of side links hinged together to adjacent links, separable female mold sections sustained by and between each pair of links, a core carrying bar also sustained by and between each pair of links, mold opening and closing slides sustained by each link and coöperatively connected with the respective female mold sections, a heating tunnel through which said chain passes, mold and core heating instrumentalities in said tunnel, means for imparting motion to said chain to move the units past a charging station and an extracting station, means for loosening the core from the baked product, means for operating the mold slides to separate the female mold sections, and means for moving the core between the separated sections to eject the product.

21. In a machine of the class described, an endless chain composed of baking mold units each comprising pairs of side links hinged together to adjacent links, separable female mold sections sustained by and between each pair of links, a core carrying bar also sustained by and between each pair of links, mold opening and closing slides sustained by each link and coöperatively connected with the respective female mold sections, means for imparting motion to said chain to move the units past a charging station and an extracting station, means for loosening the core from the baked product, means for operating the mold slides to separate the female mold sections, means for moving the core between the separated sections to eject the product, and a receiving member into which the product is directed by the last said movement of the cores.

22. In a machine of the class described, an endless chain composed of baking mold units each comprising pairs of side links hinged together to adjacent links, separable female mold sections sustained by and between each pair of links, a core carrying bar also sustained by and between each pair of links, mold opening and closing slides sustained by each link and coöperatively connected with the respective female mold sections, a heating tunnel through which said chain passes, mold and core heating instrumentalities in said tunnel, means for imparting motion to said chain to move the units past a charging station and an extracting station, means for loosening the core from the baked product, means for operating the mold slides to separate the female mold sections, means for moving the core between the separated sections to eject the product, and a receiving member into which the product is directed by the last said movement of the cores.

23. In a machine of the class described, an endless chain composed of baking mold units each comprising pairs of side links hinged together to adjacent links, separable female mold sections sustained by and between each pair of links, a core carrying bar also sustained by and between each pair of links, mold opening and closed slides sustained by each link and coöperatively connected with the respective female mold sections, means for imparting motion to said chain to move the units past a charging station and an extracting station, means for loosening the core from the baked product, means for operating the mold slides to separate the female mold sections, means for moving the core between the separated sections to eject the product, and a trimmer tube into which the product is ejected and through which the product is made to pass by the action of the said cores during the last said movement thereof.

24. In a machine of the class described, an endless chain composed of baking mold units each comprising pairs of side links hinged together to adjacent links, separable female mold sections sustained by and between each pair of links, a core carrying bar also sustained by and between each pair of links, mold opening and closing slides sustained by each link and coöperatively connected with the respective female mold sections, a heating tunnel through which said chain passes, mold and core heating instrumentalities in said tunnel, means for imparting motion to said chain to move the units past a charging station and an extracting station, means for loosening the core from the baked product, means for operating the mold slides to separate the female mold sections, means for moving the core between the separated sections to eject the product, and a trimmer tube into which the product is ejected and through which the product is made to pass by the action of the said cores during the last said movement thereof.

25. In a machine of the class described wherein is provided molding and baking devices and a trimming mechanism; means for separately collecting the trimmed articles and the trimmings as the same pass the trimming mechanism, means for separately conveying the trimmed article and the trimmings out of the machine, said means including a pneumatic conveyer for the trimmings and another conveyer for the trimmed articles.

26. In a machine of the class described, the combination with trimmer tubes through which the trimmed article is passed, of a surrounding receptacle having a restricted entrance adjacent to the trimmer tubes in which the trimmings are received, and a suction device for conveying the trimmings from said receptacle.

27. In a machine of the class described, molding and baking devices which comprise separable female molds and a core therefor, a trimmer tube, means for separating said female members and means for passing said core between the separated members to push an article through the trimmer tube, and means for separately collecting the trimmed article and the trimmings as the same pass the trimmer tube.

28. In a machine of the class described, molding and baking devices which comprise separable female molds and a core therefor, a trimmer tube, means for separating said female members and means for passing said core between the separated members to push an article through the trimmer tube, means for separately collecting the trimmed article and the trimmings as the same pass the trimmer tube, and means for conveying the trimmings away from the machine.

29. In a machine of the class described, the combination with the trimmer tube, a throat beneath the trimmer tube through which the trimmed article passes, a pan surrounding the trimmer tube and having an entrance through which the trimmings pass from the trimmer tube and a suction device for conveying the trimmings from the pan.

30. In combination with a series of sets of molding and baking devices, a set of trimming tubes, a box conveyer adapted to deliver boxes to and remove the same from the trimming tubes, means for opening said molding devices to release the product, and means movable through the open molds for directing the product out of the molding devices to and through said trimming tubes.

31. In a machine of the class described, a series of molding and baking devices each comprising separable female mold members, a core therefor, a trimmer tube, means for advancing said devices past the trimmer tube, mold separating members, levers for actuating said separating members at the extracting station to open the molds, reciprocating devices for moving the cores through the open molds to direct the product through the trimmer tube, and means for applying heat to the mold after leaving the charging station, and means at the charging station for introducing batter to the molds.

32. In a machine of the class described, molding and baking devices which comprise separable female molds and a core therefor, means for lifting said core to release it from the product, means for subsequently opening said molds to release the product therefrom, and means for passing said core through between the separated mold members.

33. In combination with a series of sets of molding and baking devices and means for causing the same to relatively travel, a relatively stationary set of trimming tubes over which said devices pass, a box conveyer adapted to deliver boxes beneath and remove the same from the trimming tubes, means for opening the molding devices to release the product directly into the trimming tubes, and means for passing the product through the trimming tubes directly into the boxes.

34. In a cone baking machine, a carrier movable in an orbit, a plurality of molds supported by said carrier, core supports on said carrier, cores mounted on said supports and movable into, through and out of said molds in downward and upward directions respectively, while maintaining their axes in vertical position, means operative to cause movement of said cores, and means for heating said molds and cores.

35. In a cone baking machine, a carrier movable in an orbit, a plurality of molds supported by the said carrier, core supports on said carrier, cores mounted on said supports and movable into, through and out of said molds in downward and upward directions respectively, while maintaining their axes in vertical position, means operative to cause movement of said cores into and out of said molds, other means operative to cause movement of said cores through said molds, and means for heating said molds and cores.

36. In a cone baking machine, a relatively movable carrier, a plurality of molds supported by said carrier, core supports on said carrier, cores mounted on said supports and movable into and out of said molds in downward and upward directions respectively, while maintaining their axes in vertical position, means operative to cause movement of said cores into and out of said molds, means for opening said molds, and means for moving said cores through the open molds, and means for heating said molds and cores.

37. In a cone baking machine, a support, a plurality of molds supported by said support, core sustaining elements on said support, cores mounted on said elements, and movable into, through and out of said molds in downward and upward directions respectively, means operative to cause movement of said cores and means for heating said molds and cores.

38. In a cone baking machine, a movable carrier, a plurality of molds supported by said carrier, core supports on said carrier, cores mounted on said supports, mechanism for moving said cores into the molds, then through the molds in the same direction of movement and back into the molds and out of the molds in the reverse direction of movement.

39. In a cone baking machine, a movable carrier, a plurality of molds supported by said carrier, core supports on said carrier, cores mounted on said supports, mechanism for moving said cores into the molds, then through the molds in the same direction of movement and back into the molds and out of the molds in the reverse direction of movement, while maintaining the axes of the cores in a position parallel to the axes of the mold cavities, means for loading the molds and means for applying heat for baking purposes.

40. In a machine of the class described wherein is provided molding and trimming devices that comprise separable female mold elements, a core therefor, a trimmer tube; means for detaching the core from the contents of the female mold, means for separating the mold sections to release the contents and means for moving the core between the separated female mold sections to force the released product through the trimmer tube.

41. In a machine of the class described wherein is provided molding devices which consist of separable female mold elements, and a core therefor; means for detaching the core from the contents of the female mold elements, means for separating the mold sections to release the contents, and means for moving the core into and through between the female mold sections when the same are separated to insure the discharge of the released product from the molding devices.

42. In a machine of the class described, the combination with the trimmer tube and a member for pushing the cones through the trimmer tube to trim the same; of a receptacle embracing the trimmer tube and having a mouth or entrance surrounding the trimmer tube adjacent to the trimming edge of the trimmer tube, and means for applying suction to said receptacle to cause the flow of air into the receptacle around the trimming end of the trimmer tube.

43. In a machine of the class described. the combination with the trimmer tube and a member for pushing the cones through the trimmer tube to trim the same; of a receptacle embracing the trimmer tube and having a mouth or entrance surrounding the trimming tube adjacent to the trimming edge of the trimmer tube, means for applying suction to said receptacle to cause the flow of air into the receptacle around the trimming end of the trimmer tube, whereby to draw off the trimmings through the receptacle and simultaneously effect a cooling of the trimming end of the trimmer tube.

44. In a machine of the class described, wherein is provided molding devices, a trimmer tube located adjacent to and beneath the molding devices, said molding devices comprising separable female mold elements and a core therefor and means for discharging the article from the molds directly into the trimmer tube and forcing the same through the trimmer tube, of mechanism for simultaneously sucking up the trimmings and cooling the trimmer tube.

45. The combination with separable female molds, of a combined molding, cone detaching and ejecting core adapted to eject the cone through between the open molds in the direction of the point of the core, and means for operating the aforesaid parts.

46. The combination with separable female mold members and a trimming tube located beneath the same, of a combined molding, ejecting and trimming core coöperative with said mold members and the trimming tube and movable through the separable mold and means for operating the aforesaid parts.

47. In combination with a series of sets of molding and baking devices, a set of trimming tubes, a box conveyer adapted to deliver boxes to the trimming tubes, means for opening said molding devices to release the product, and means movable through the open molds for directing the product out of the molding devices into said trimming tubes.

48. In a machine of the class described, wherein is provided molding and baking devices that include separate female molding elements and a core therefor; means for detaching the core from the article held in the female molding elements, means for separating the female molding elements, and means for applying pressure by the core internally in the direction of the axis of the core to the article as the molding elements separate to eject the article in the event that the cones hang up in the molds after being detached therefrom.

49. The method of extracting hollow molded and baked articles from molds and their cores; said method consisting in loosening the core from the article while holding the article by external engagement, then releasing the article from the female mold while holding the article against mold-following movement by internal engagement with said core and simultaneously pushing the article in the direction of its axis from between the female mold parts by pressure applied within the article.

50. The method of releasing cones and ejecting the same from their mold sections and cores, which method consists in freeing the cone from the core while holding the cone by external engagement, releasing the cone from external engagement and forcing the cone out of the mold by internally engaging the same with the core in the event that the cone fails to leave the molds when released.

51. The method of releasing cones and ejecting the same from their mold sections and cores, which method consists in detaching the cone from the molds and core to free the cone and permit it to drop, catching the cone as it falls and holding it beneath the molds, and finally releasing the cone from being held beneath the molds by engaging the cone by a movement in the direction of the axis of the core and internally and thereby removing it from the place where it was held.

52. The method of releasing cones and ejecting the same from their mold sections and cores, which consists in freeing the cone from the core while holding it by external engagement, then detaching the cone from the molds while holding the cone against mold-following movement by internal engagement thereof, pushing or ejecting the cone through the molds, in the event that it fails to drop when released from the molds, by internal engagement of the cone by a movement in the direction of the axis of the core and thereby removing the cone from the place where it was held, substantially as described.

53. In a machine of the class described, molding and baking devices and a trimming mechanism into which the product from the molding and baking devices is passed for the purpose of separating the excess material from the article produced, means for separately collecting the trimmed article and the trimmings as they pass the trimming mechanism, said means including a suction device for conveying the trimmings away from the trimming mechanism.

ALBERT E. DIETERICH.